United States Patent
Kiger et al.

(10) Patent No.: US 10,294,693 B2
(45) Date of Patent: May 21, 2019

(54) LATCH ASSEMBLY

(71) Applicant: MOTOROLA SOLUTIONS, INC, Schaumburg, IL (US)

(72) Inventors: William B. Kiger, Hoschton, GA (US); Mark C. Taraboulos, Dunwoody, GA (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 963 days.

(21) Appl. No.: 14/231,210

(22) Filed: Mar. 31, 2014

(65) Prior Publication Data
US 2015/0275554 A1  Oct. 1, 2015

(51) Int. Cl.
E05C 1/10 (2006.01)
E05B 17/20 (2006.01)
E05C 1/04 (2006.01)
H01M 2/10 (2006.01)

(52) U.S. Cl.
CPC ............ *E05B 17/2069* (2013.01); *E05C 1/04* (2013.01); *H01M 2/1022* (2013.01); *Y10T 29/49826* (2015.01); *Y10T 292/1014* (2015.04)

(58) Field of Classification Search
CPC .... E05B 17/2069; H01M 2/1022; E05C 1/04; Y10T 292/1014; Y10T 29/49826
See application file for complete search history.

(56) References Cited

U.S. PATENT DOCUMENTS

| 5,225,293 | A  |   | 7/1993  | Mitchell et al. |            |
|-----------|----|---|---------|-----------------|------------|
| 5,427,088 | A  | * | 6/1995  | Graether        | A61B 17/0231 |
|           |    |   |         |                 | 600/226    |
| 6,623,049 | B2 | * | 9/2003  | Shreeve         | E05C 19/06 |
|           |    |   |         |                 | 292/19     |
| 8,085,529 | B2 | * | 12/2011 | Zhang           | H01H 13/705 |
|           |    |   |         |                 | 361/679.01 |
| 8,228,029 | B2 | * | 7/2012  | Meyer           | H01M 2/1066 |
|           |    |   |         |                 | 320/112    |
| 8,814,893 | B2 | * | 8/2014  | Cote            | A61B 17/3211 |
|           |    |   |         |                 | 30/286     |
| 2009/0239140 | A1 |   | 9/2009  | Shen et al.   |            |
| 2010/0276946 | A1 |   | 11/2010 | Whetten et al. |           |
| 2012/0299316 | A1 | * | 11/2012 | Mangaroo      | G06F 1/1626 |
|           |    |   |         |                 | 292/179    |

OTHER PUBLICATIONS

Motorola Minitor VI (6) Pager Features—Extracted from www.pwservice.com/pagers/firepagers.

* cited by examiner

*Primary Examiner* — Kristina R Fulton
*Assistant Examiner* — Thomas L Neubauer
(74) *Attorney, Agent, or Firm* — Barbara R. Doutre

(57) ABSTRACT

A latch apparatus is formed of a cantilevered beam (202) and a button (204). The cantilevered beam (202) comprises a loading feature (210) and a notch (216), while the button (204) comprises a slot (218) and an engagement tab (220). When mounted within a cavity of a housing, the cantilevered beam and button provide both push-in and side sliding movement of the button. The latch is locked by sliding the button in one direction, and the latch is unlocked by pushing the button inward and then sliding the button in an opposite direction. The housing may further comprise an angled catch feature within the cavity for mating with a complimentary angle of the button to avoid inadvertent unlocking of the latch. The combination of push in force and side sliding force minimizes inadvertent unlocking of the latch assembly.

14 Claims, 11 Drawing Sheets

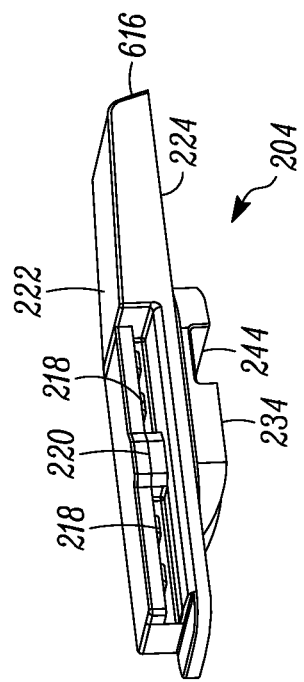
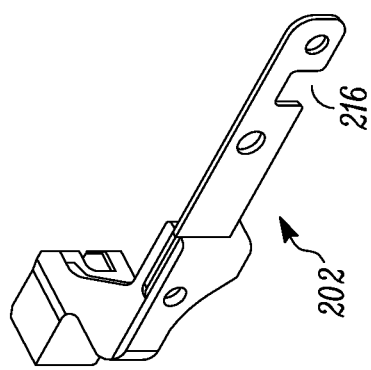
FIG. 3

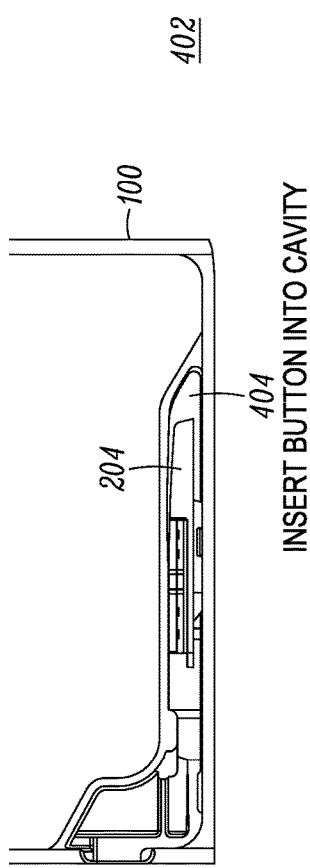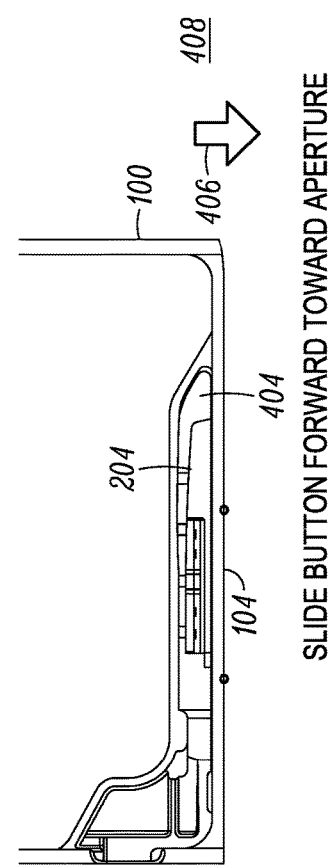
FIG. 4A — INSERT BUTTON INTO CAVITY
FIG. 4B — SLIDE BUTTON FORWARD TOWARD APERTURE

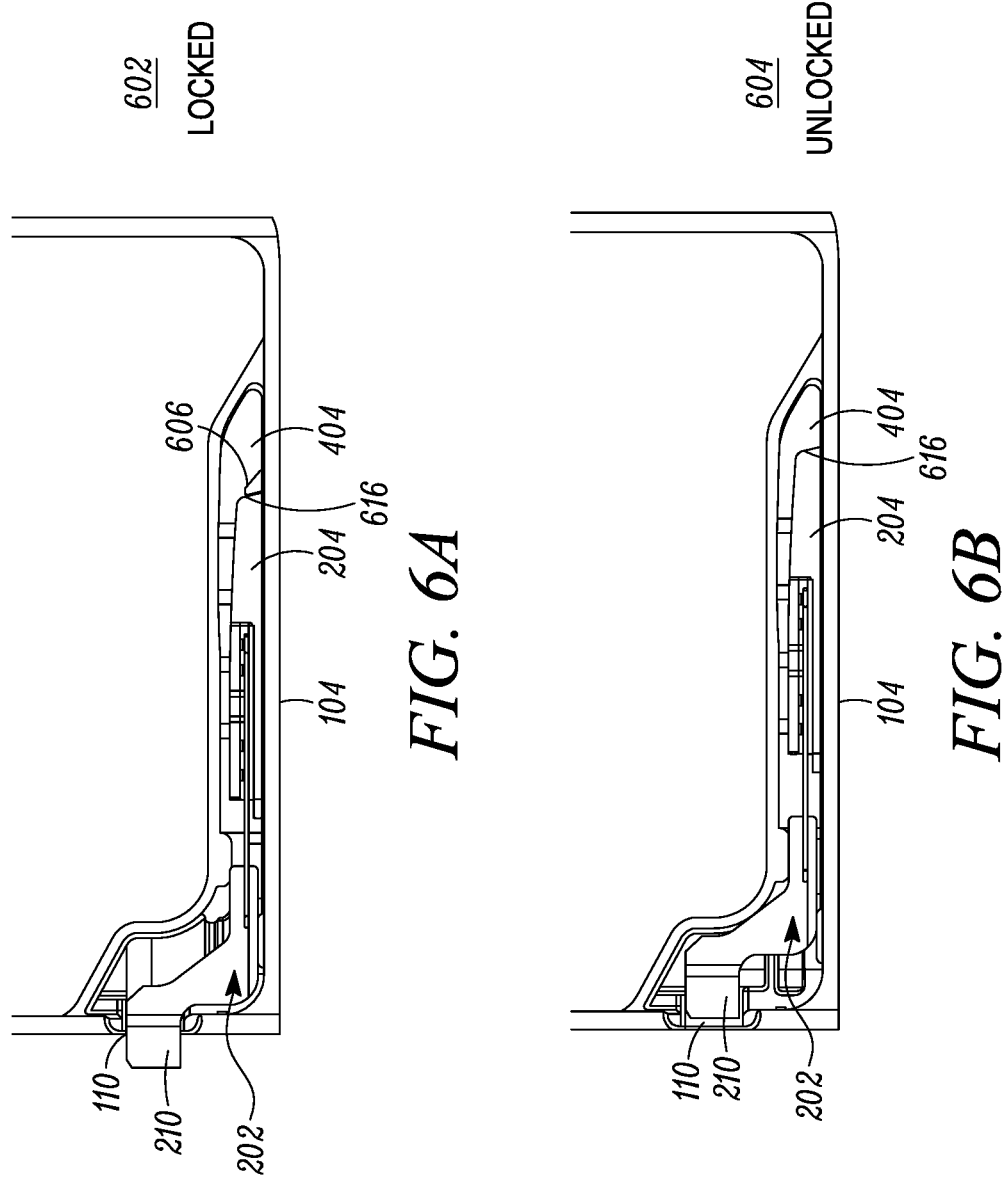

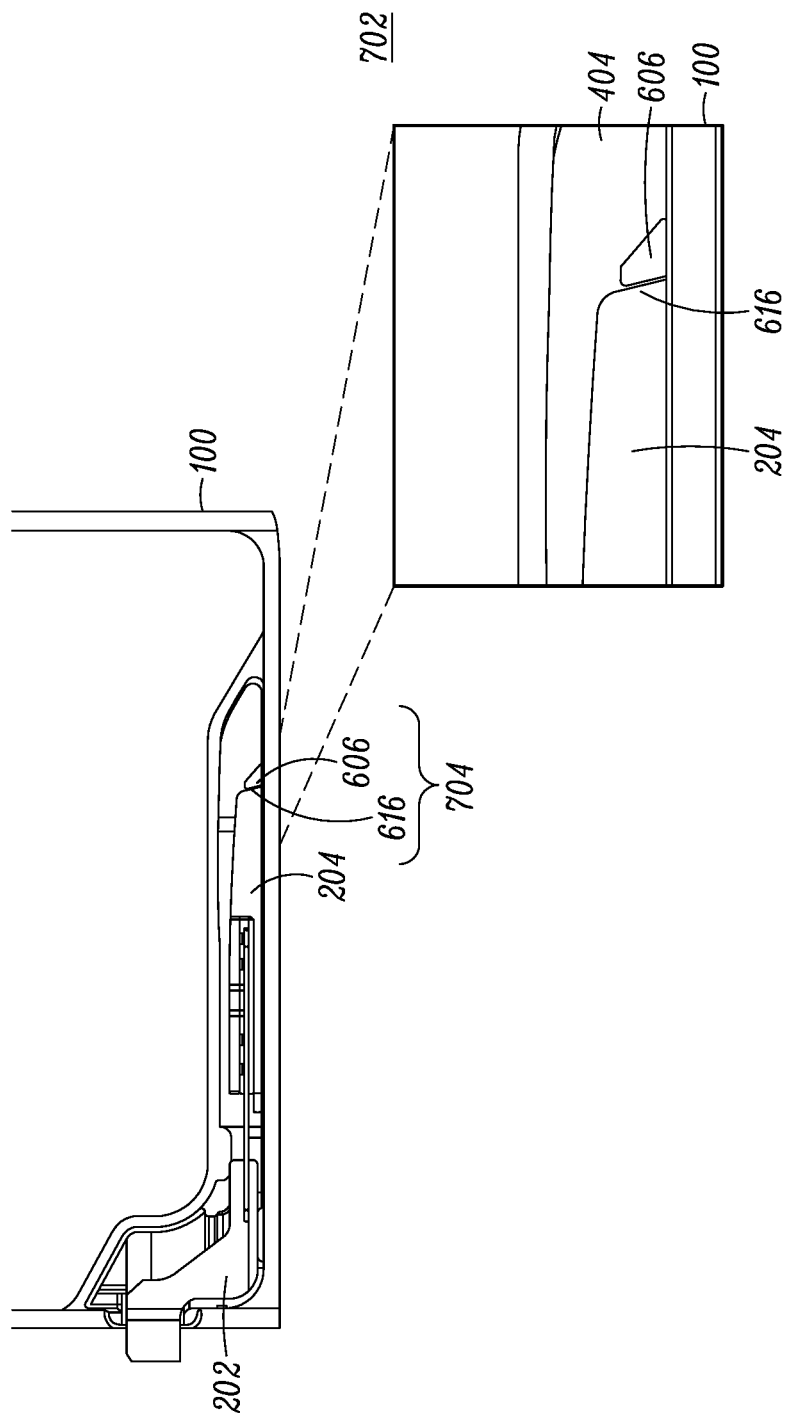

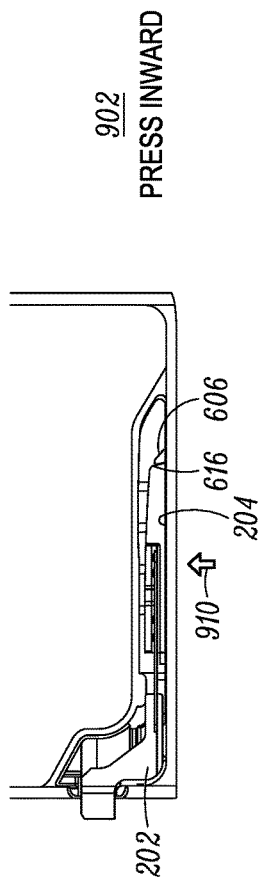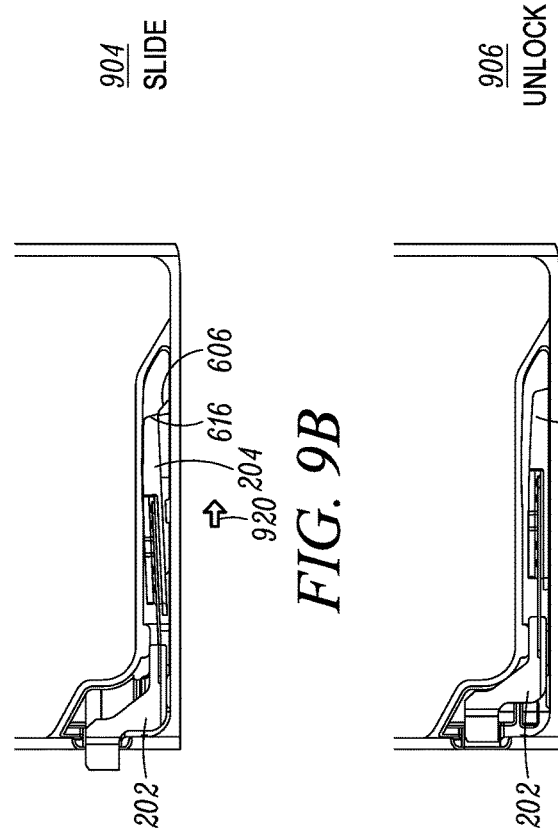

LATCH ASSEMBLY

TECHNICAL FIELD

The present application relates generally to latch assemblies and more particularly to a latch assembly for portable electronic devices.

BACKGROUND

Portable electronic devices are becoming increasingly more compact in size. These devices have very little space for user interfaces and peripheral devices, such as latches for the insertion and removal of batteries or battery packs. Certain types of portable communication devices, such as devices used in public safety applications, must adhere to robust environmental testing standards, for example shock, vibration, drop testing and the like. A pager is an example of a small, portable battery operated communication device with limited space that needs to operate under such robust conditions. The pager's battery pack or battery tray must fit securely to the host paging device while remaining accessible to the user for removal and replacement. A broken battery latch may cause the device to become inoperative. Other peripheral devices may likewise require secure retention to a host device.

Accordingly, it would be desirable to provide an improved latch assembly.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 is another view of FIG. 2A further illustrating the latch assembly's hook and notch configuration in accordance with some embodiments;

FIGS. 4A and 4B illustrate the installation of the button into the housing in accordance with some embodiments;

FIGS. 6A and 6B show the latch in locked and unlocked positions in accordance with some embodiments;

FIG. 7 shows the latch in the locked position with an expanded view illustrating a catch feature formed within the housing in accordance with some embodiments;

FIGS. 9A, 9B and 9C show an unlocking procedure for the latch in accordance with some embodiments;

Figure 1:
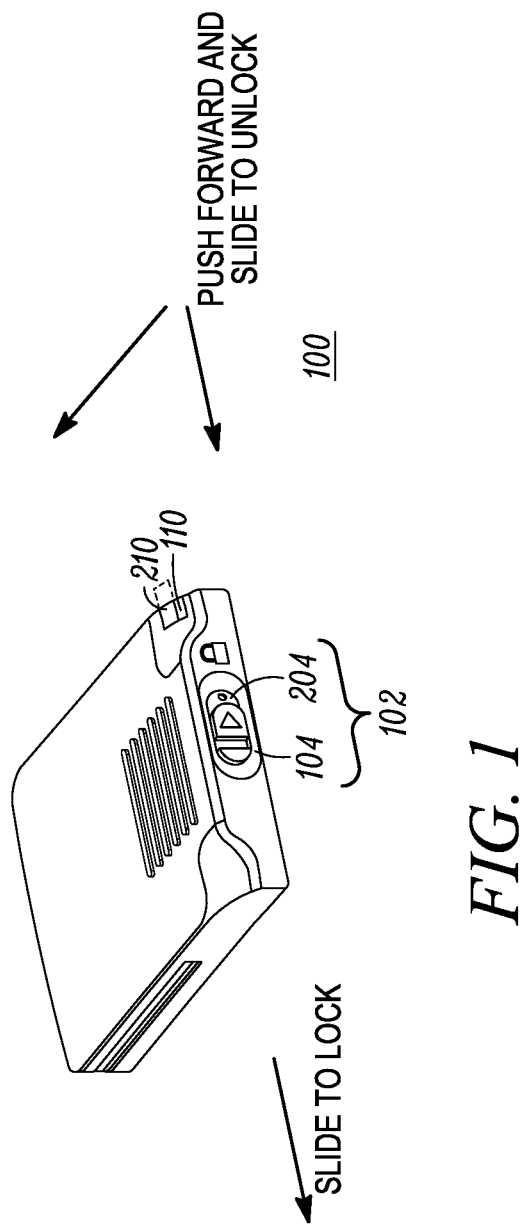
FIG. 1 is a housing comprising a latch assembly formed in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail embodiments of the invention, it should be observed that such embodiments reside primarily in combinations of apparatus components related to a latch assembly. Briefly, the latch assembly comprises to main components, a cantilevered beam having a notch formed therein and a button having a slot with an engagement tab formed therein. The cantilevered beam is held within the slot of the button by alignment of the beam's notch with the button's engagement tab. The two piece parts fit within a cavity of a housing, such as a battery pack housing or other electronic device housing. The cantilevered beam forcibly loads the button against an aperture of the housing, thereby providing user access to the button. The latch is locked by sliding the button in one direction, and the latch is unlocked by pushing the button inward and then sliding the button in an opposite direction. The housing may further comprise an angled catch feature within the cavity for mating with a complimentary angle of the button to avoid inadvertent unlocking of the latch.

FIG. 1 is a housing 100 incorporating a latch assembly 102 formed in accordance with some embodiments. Housing 100 has a small, slim form factor, such as that of a battery pack for a paging device or other small host communication device typically worn in a user's pocket or on a user's belt. The latch assembly 102 operates within an aperture 104 of the housing 100. The latch assembly 102 comprises two main elements, a button 204 seen in FIG. 1 and a cantilevered beam (shown in FIG. 2A). Button 204 provides a user interface which provides both side to side and inward movement. The latch assembly 102 is unlocked by pushing the button 204 inward and sliding the button in a first direction, and the latch assembly is locked by sliding the button in a second/opposite direction. The latch assembly 102 is used to couple and uncouple the housing 100 to and from a host device in a reliable manner while further providing robustness against inadvertent unlocking, for example when the device is operated within public safety environments. The housing 100 may further comprise a side port 110, to be discussed later, for the retraction and protrusion of a force loading feature 210 (discussed in conjunction with FIG. 2A).

Figure 2:
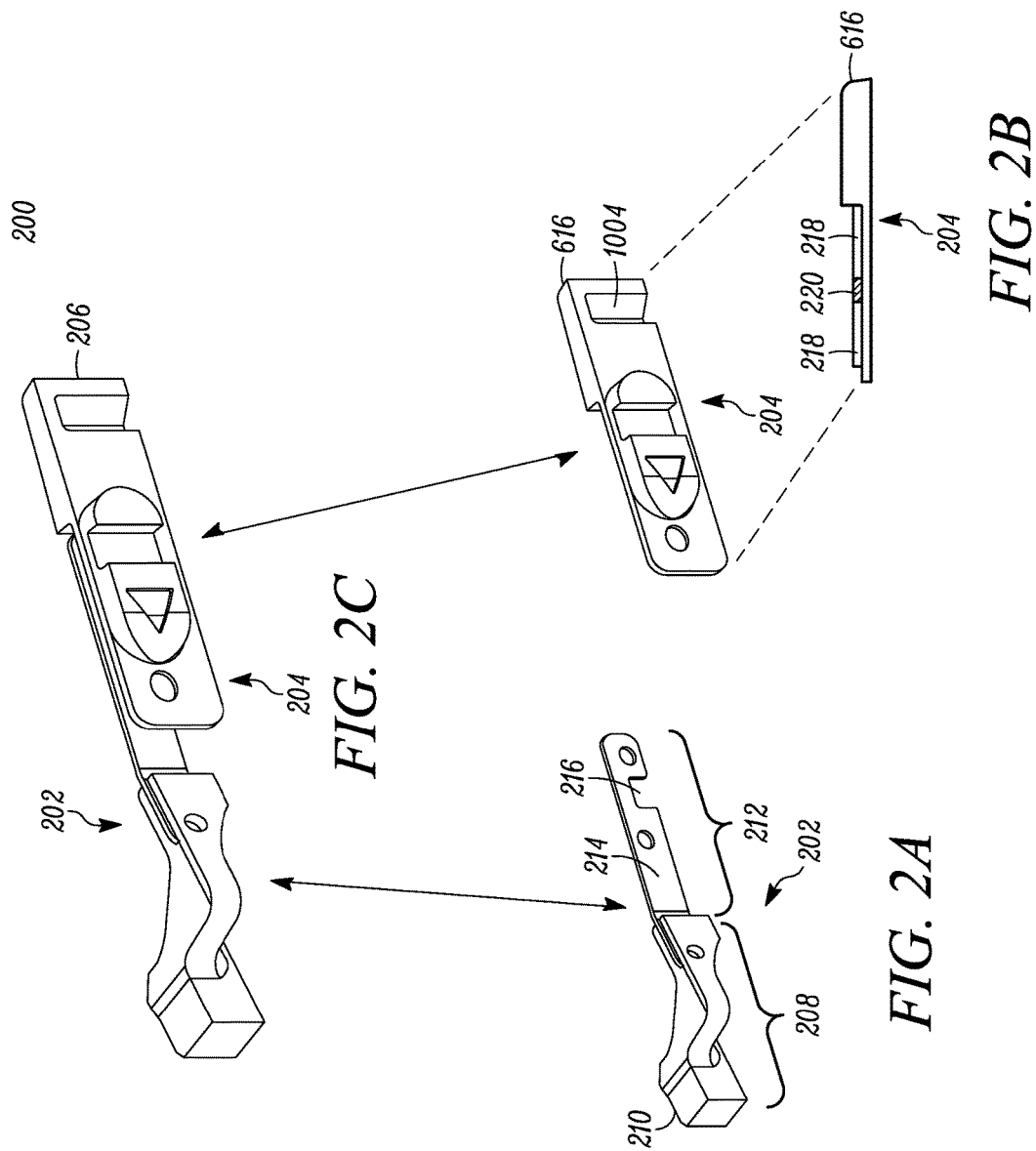
FIGS. 2A, 2B and 2C show a cantilevered beam and button associated with the latch assembly in accordance with some embodiments.

FIGS. 2A, 2B, 2C show the two main piece parts 200 used in the latch assembly in accordance with some embodiments. The two piece parts comprise a cantilevered beam 202 and the button 204. The cantilevered beam 202 is formed as a single piece part having two sections, the first section 208 providing a force loading feature 210, such as a plastic force loading feature, and the second section 212 providing a leaf spring 214, such as a metal leaf spring, formed at an angle relative to the first section 208 to facilitate a preload when installed in the housing 100. The leaf spring comprises a notch 216 formed therein. The two pieces of the cantilevered beam 202 may be formed for example, as an insert molded piece part or may further comprise adhesives, snap features, fasteners, ultrasonic stakes or heat stakes to name a few. The button 204 comprises a single piece part, such as a single plastic piece part, having a slot 218 with an engagement tab 220 tab formed therein. The slot 218 and engagement tab 220 are located on an interior side of the button 204 which can be seen in the break-away top view. The slot 218 receives and engages the cantilevered beam 202 by aligning the notch 216 with the engagement tab 220.

Figure 10:
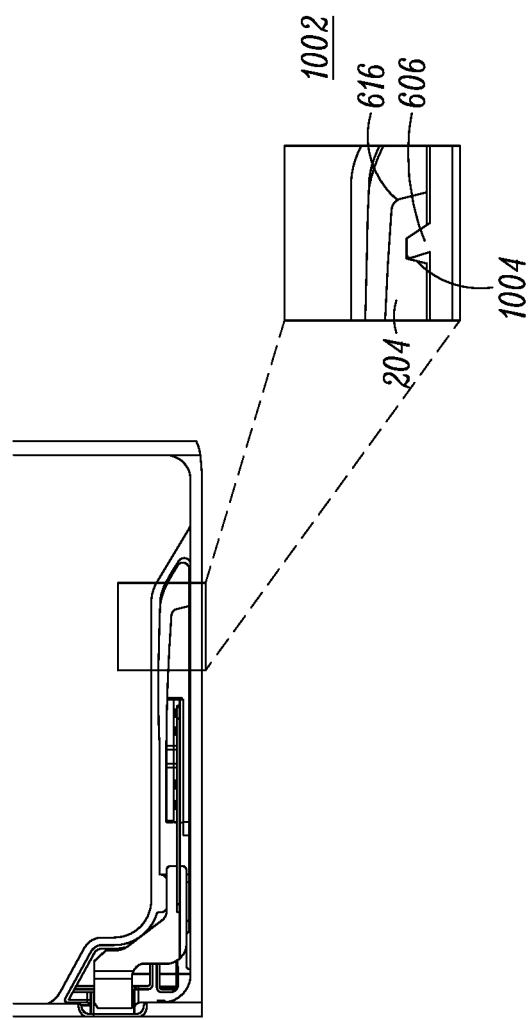
FIG. 10 is a partial cross sectional view of the button further comprising a recess within which to nest the catch feature in accordance with some embodiments.

The button 204 may further comprise an angled recess capture feature 1004 which will be described later in conjunction with FIG. 10. The button 204 may further comprise an end portion, which as described later, may be an angular end portion 616.

FIG. 3 shows another view of the latch's hook and notch configuration in accordance with some embodiments. The cantilevered beam 202 and the button 204 are shown separately. The button's interior surface 222 comprises slot 218 having engagement tab 220 formed therein. The button's angled end portion 616 is also shown.

FIG. 3 also illustrates that the button 204 may be shaped as an oval or rectangular shaped piece part or other elongated shape having two sides, the interior side 222 and an exterior side 224. For the purposes of this application, the button 204 does not protrude externally to the housing 100 but rather is seated within the aperture 104 of the housing for user access. The exterior side 224 of the button 204 provides a user interface formed of a finger grip 234 having a recess 244 which allows the user to manipulate the button from side to side within the aperture 104 of the housing and further allows the user to press the button 204 inward when in the correct position. The exterior side 224 of the button 204 further provides a mechanical interface through angled recess capture feature 1004 (to be described in further detail later).

FIGS. 4A and 4B illustrate installing the button 204 into the housing 100 in accordance with some embodiments. As was discussed in FIG. 1 housing 100 comprises an aperture 104 within which button 204 can be accessed as part of a user interface. As seen in the views of FIG. 4B, the aperture 104 leads into a larger cavity 404 within the housing 100. In FIG. 4A, view 402, the button 204 is inserted into the cavity 404. In FIG. 4B, view 408, the button is slid forward 406 toward aperture 104 (the aperture is represented in this view by spacing between two dots). The aperture 104 leading into cavity 404 provides the room (the depth) for the user to push the button 204 inward with a normal force for unlocking purposes. The aperture 104 is represented in FIG. 4B by two dots.

Figure 5A:
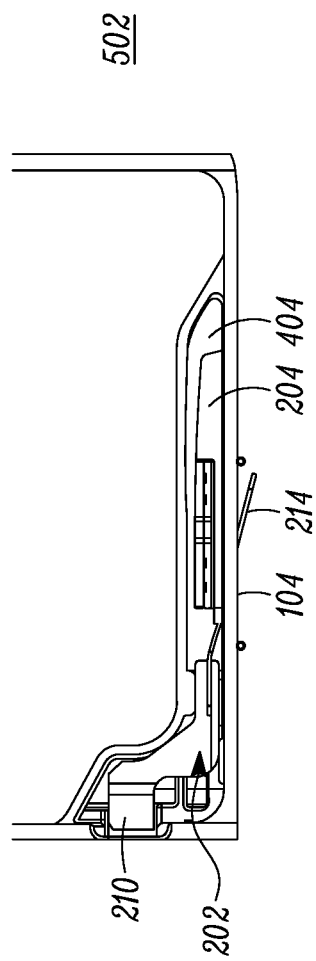
FIGS. 5A, 5B and 5C illustrate the installation of the cantilevered beam into the housing in accordance with some embodiments.
Figure 5B:
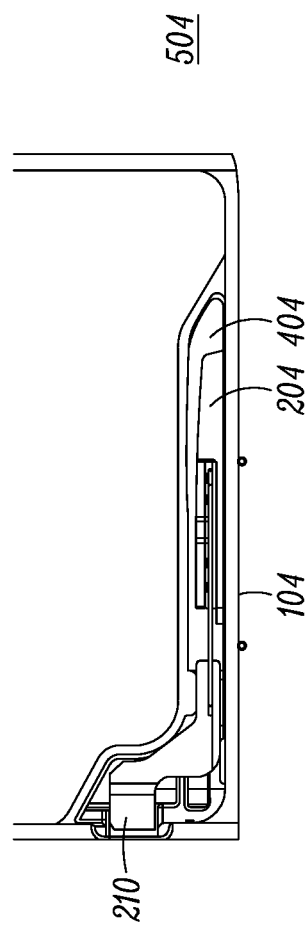
Figure 5C:
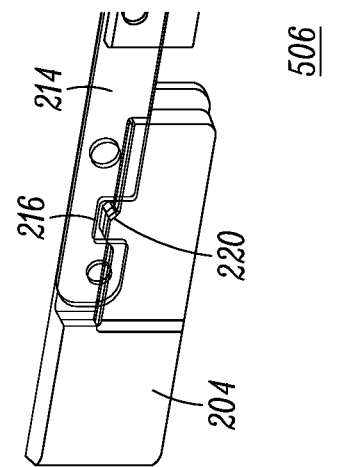

FIGS. 5A, 5B, 5C illustrate installing the cantilevered beam 202 into the housing 100 in accordance with some embodiments. At FIG. 5A, view 502, the cantilevered beam is inserted within cavity 404 by deflecting the leaf spring 214 through aperture 104 to apply a preload to cantilevered beam 202. The first section 208 having force loading feature 210 is thus within the cavity 404 while the leaf spring 214 is deflected out through aperture 104. At FIG. 5B, view 504, the notch 216 of leaf spring 214 is aligned to engagement tab 220 of button 204. Alignment of the notch 216 to the engagement tab 220 generates compressive forces on the button in the housing. View 506, FIG. 5C, shows another view (without the housing 100) of the alignment between the notch 216 of leaf spring 214 with engagement tab 220 of button 204. The button 204 is loaded by the cantilevered beam 202 with a sufficient force for retention while still permitting side to side sliding movement and inward pushing movement within the cavity 404.

As an embodiment, the cantilevered beam 202 may be formed for example of a plastic force loading feature 210 inserted within a corresponding shaped portion of the cavity 404 of the housing 100. The leaf spring 214 may be formed of metal beam with notch for inserting into the slot 218 of the button 204 within the cavity 404 thereby spring loading the cantilevered beam into the button within the housing.

The engagement tab 220 within the slot 218 of the button 204 and the notch 216 of the cantilevered beam 202 form a non-rigid connection. The non-rigid connection advantageously provides dissipation of drop energy through the cantilevered beam 202 and not directly to the engagement tab 220 of the button 204.

The latch assembly 102 can be locked by sliding the button 204 in one direction and can be unlocked by pushing the button inward and sliding the button the opposite direction.

FIGS. 6A, 6B show the latch in a locked position at view 602 and an unlocked position at view 604 respectively. As seen in the locked FIG. 6A, view 602, the force loading feature 210 of cantilevered beam 202 exits or protrudes through the housing 100 via side port 110 and is retracted within the housing in unlocked position, FIG. 6B, view 604. Thus, even if the housing 100 is dropped while in a locked position, and were the force loading feature 210 to be inadvertently pushed in, the housing 100 would remain locked due to the latch button 204 not been pushed in. Again, both an inward push force and a side to side slide force are required to unlock the assembly. The user interface of push-in and slide combination thus provides an additional level of robustness to avoid unlocking the housing 100.

FIG. 6A further shows the housing 100 having an angled catch feature 606. The button 204 having an end portion 614 abuts with the catch feature 606 of the housing 100 for a locked position. As will later be shown in other views, the button 204 captures the catch feature 606 in the unlocked position, FIG. 6B, view 604.

FIG. 7 shows the latch in a locked position with an expanded view 702 illustrating a catch feature 606 formed within housing 100 in accordance with some embodiments. When in the locked position, the button 204 abuts with the angled catch feature 606. In accordance with some embodiments, the button 204 comprises a complimentary angle 616 which abuts with angled catch feature 606 when in the locked position. In accordance with some embodiments, the angled catch feature 606 of housing 100 and complimentary angle 616 of the button 204 abut to provide a cam lock 704. The mated and complimentary angles of the button 204 and housing 100 provide a cam lock action by exerting a normal force on the button 204 as it slides along the complimentary angle catch feature 606 of housing 100. This arrangement acts to drive the button 204 towards the housing 100 with a first force in addition to a second force provided by the cantilevered beam's 202 spring 214. The cam lock action of the mating angles 606 and 616 provide additional retention force to minimize inadvertent movement of the loading feature 210 of the latch from moving to the unlocked position.

The loading feature 210 protrudes from the housing 100 when the latch is locked, and the loading feature is retracted when the latch is unlocked. The latch system provided by the various embodiments beneficially allows the system to stay locked even if the loading feature 210 were to become inadvertently pushed in as a result of drop or other inadvertent impact.

Figure 8A:
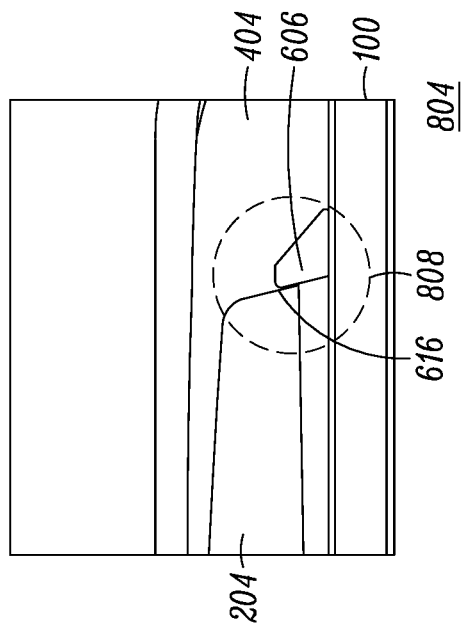
FIGS. 8A and 8B show a portion of the button in a nominal locked position within the housing and a possible position of the button during a drop, or equivalent impact, event in accordance with some embodiments.
Figure 8B:
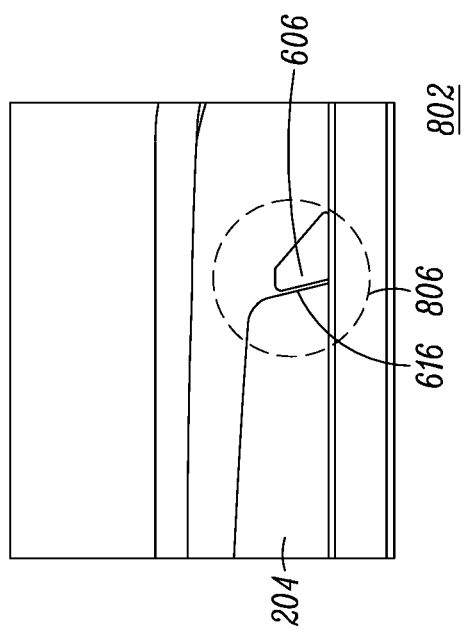

FIGS. 8A, 8B show a portion of the button 204 in a nominal locked position 802 and a possible position of the button during a drop, or equivalent impact event 804 respectively. A back angle 806 on catch feature 606 and the button's complimentary angle 616 provide resistance to the button rising during drop thereby maintaining alignment of the button to the catch feature 606. As the button moves to the right during a drop, or equivalent impact event, the button 204 will ride down the back angle 808 as seen at FIG. 8B, view 804, to maintain alignment to the catch feature 606. Again, the cantilevered beam 202 and the button 204 are coupled in a non-rigid manner thereby limiting energy transfer during drop.

FIG. 9A, 9B, 9C show the unlocking procedure in accordance with the various embodiments. The complimentary angles 606, 616 are still mated at FIG. 9A, view 902, as the button 204 is pressed inward 910. At FIG. 9B, view 904, the button is slid to the right 920 which causes the angled catch feature 606 to nest within the button 204, which is shown as unlocked position in FIG. 9C, view 906, and further illustrated in FIG. 10. As seen in FIG. 10, in cross section 1002, the button 204 may further comprise a recess, such as angled recess capture feature 1004 (which was also previously shown in FIG. 2B) within which to nest the angled catch feature 606. The angled end portion 616 of button 204 is slid beyond the catch feature 606. Thus, the angled catch feature 606 is captured and nested within the angled recess capture feature 1004 of the button 204 while the latch is in an unlocked position.

Figure 11:
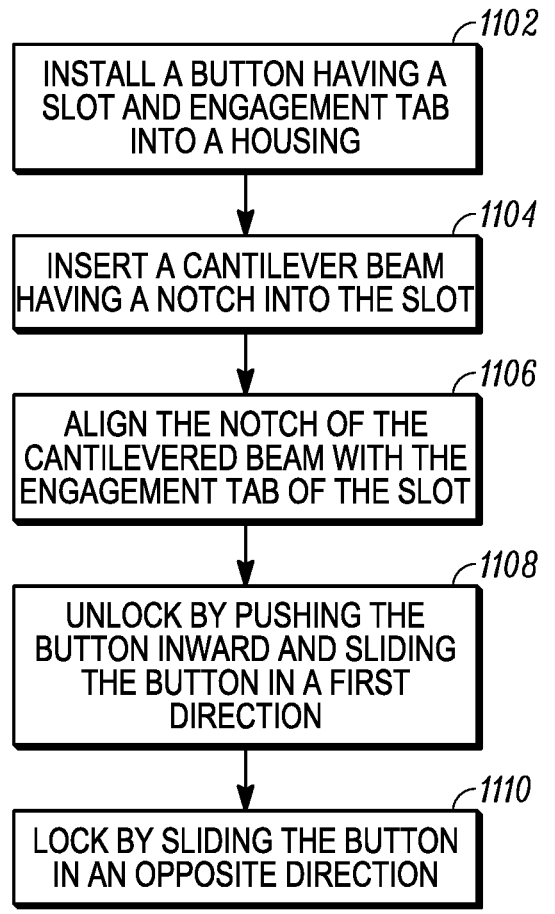
FIG. 11 summarizes a method for assembling the latch in accordance with some embodiments.

FIG. 11 summarizes a method 1100 for assembly the latch in accordance with some embodiments. The method 1100 of assembling a latch begins at 1102 by installing a button having a slot with an engagement tab formed therein into a housing, such as a battery housing or other communication device. For example, button 204 having a slot 218 with an engagement tab 220 formed therein can be inserted into housing 100. The method continues at 1104 by inserting a cantilevered beam having a notch formed therein into the slot of the button. This step can be accomplished for example by deflecting the cantilevered beam 202. The deflecting of the cantilevered beam 202 applies preloading of the cantilevered beam within the housing. The method continues at 1106 by aligning the notch of the cantilevered beam with the engagement tab of the slot. This alignment allows for the button to be retained and remain movable inward and slideable from side to side with appropriate forces. The assembly is thus complete and the latch can be unlocked at 1108 by pushing the button inward and sliding the button in a first direction. The latch can be locked at 1110 by sliding the button in a second (opposite) direction.

The latch assembly provided by the embodiments beneficially provides protection against inadvertent unlocking. The low profile nature of the retention features provides an improvement over traditional latch apparatus devices. The user interface is easy to use. The latch assembly particularly advantageous for small portable electronic products used in public safety environments which need to remain operational under rugged conditions. The latch uses a minimal number of piece parts and is easy to assemble without the use of individual clips, screws, and other individual piece parts making it highly manufacturable and cost effective.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. It is submitted with the understanding that neither will be used to interpret or limit the scope or meaning of the claims. In addition, in the foregoing Detailed Description, it can be seen that various features are grouped together in some embodiments for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A latch assembly, comprising:
    a housing having an aperture leading into a cavity, and the housing having a catch feature formed as part of the housing and located within the cavity, the housing further comprising a side port;
    a button slideably coupled within the aperture, the button being formed of a single plastic piece part having an exterior side that does not protrude externally to the housing, the button having an interior side providing a slot with an engagement tab formed within the slot, the button having an end portion for abutting with the catch feature of the housing for a locked position and for capturing the catch feature in an unlocked position; and
    a cantilevered beam formed of a single piece part formed of a first section providing a plastic force loading feature and a second section formed of a metal leaf spring, the leaf spring having a notch, the notch aligning to the engagement tab of the button for retention and spring loading of the cantilevered beam within the slot of the button, the force loading feature of the cantilevered beam being retracted within the housing through the side port in response to the button being both pushed in and slid in a first direction for an unlocked position, and the loading feature being protracted outside of the side port of the housing in response to the button being slid in a second opposite direction for lock.

2. The latch apparatus assembly of claim 1, wherein catch feature comprises an angled catch feature, the angled catch feature being a back angle formed relative to the housing, and the end portion of the button comprises a complimentary angle relative to the back angle, the back angle on catch feature and the complimentary angle of the button providing resistance to the button rising during drop.

3. The latch apparatus assembly of claim 2, further comprising:
an angled recess formed within the button, the angled recess for capturing the angled catch feature of the housing when the button is slid to an unlocked position.

4. The latch apparatus assembly of claim 1, wherein the angled catch feature and complimentary angle of the button mate to provide a cam lock.

5. The latch apparatus assembly of claim 4, wherein the cam lock formed of the angled catch feature and complimentary angle of the button mate to provide a cam lock action.

6. The latch apparatus assembly of claim 5, wherein the mated and complimentary angles of the button and housing provide the cam lock action by exerting a normal force on the button which acts to drive the button towards the housing with a force in addition to a second force provided by the cantilevered beam spring.

7. The latch apparatus assembly of claim 6, wherein the cam lock action of the mated and complimentary angles of the button and housing provide additional retention to minimize inadvertent movement of the a loading feature of the latch from moving to the unlocked position.

8. The latch assembly of claim 1, wherein:
the engagement tab within the slot of the button and the notch of the cantilevered beam form a non-rigid connection.

9. The latch assembly of claim 8, wherein non-rigid connection provides dissipation of drop energy through the cantilevered beam and not directly to the engagement tab of the button.

10. The latch assembly of claim 1, wherein the cantilevered beam and the button are coupled in a non-rigid manner thereby limiting energy transfer during drop.

11. The latch assembly of claim 1, wherein the second section comprising the metal leaf spring is formed at an angle relative to the first section to facilitate a preload when installed in the housing.

12. The latch assembly of claim 11, wherein the leaf spring comprises the notch of the cantilevered beam for aligning with the engagement tab.

13. The latch assembly of claim 1, wherein the housing comprises a battery pack housing.

14. The latch assembly of claim 1, wherein the latch assembly is used to couple and uncouple the housing to and from a host device.

* * * * *